(12) United States Patent
Rosenberg et al.

(10) Patent No.: US 10,242,102 B2
(45) Date of Patent: Mar. 26, 2019

(54) NETWORK CRAWLING PRIORITIZATION

(71) Applicant: Samsung Electronics Co., Ltd., Suwon-si, Gyeonggi-do (KR)

(72) Inventors: Naor Rosenberg, Elyakhin (IL); Benny Zilberstein, Tel Aviv (IL); Eli Cohen, Tel Aviv (IL)

(73) Assignee: Samsung Electronics Co., Ltd., Suwon-si (KR)

( * ) Notice: Subject to any disclaimer, the term of this patent is extended or adjusted under 35 U.S.C. 154(b) by 698 days.

(21) Appl. No.: 14/585,122

(22) Filed: Dec. 29, 2014

(65) Prior Publication Data

US 2016/0188717 A1    Jun. 30, 2016

(51) Int. Cl.
*G06F 3/0484* (2013.01)
*G06F 17/30* (2006.01)

(52) U.S. Cl.
CPC ...... *G06F 17/30864* (2013.01); *G06F 3/0484* (2013.01)

(58) Field of Classification Search
CPC .................. G06F 17/30864; G06F 3/0484
USPC ....................................................... 707/689
See application file for complete search history.

(56) References Cited

U.S. PATENT DOCUMENTS

| | | | |
|---|---|---|---|
| 6,263,364 B1 * | 7/2001 | Najork | G06F 17/30864 707/E17.108 |
| 2006/0294052 A1 * | 12/2006 | Kulkarni | G06F 17/3089 707/999.001 |
| 2008/0104256 A1 * | 5/2008 | Olston | G06F 17/30899 709/217 |
| 2011/0213655 A1 * | 9/2011 | Henkin | G06Q 30/00 705/14.49 |
| 2012/0131139 A1 * | 5/2012 | Siripurapu | H04L 65/60 709/217 |
| 2014/0359411 A1 * | 12/2014 | Botta | G06F 17/2288 715/205 |

* cited by examiner

*Primary Examiner* — Vincent F Boccio
(74) *Attorney, Agent, or Firm* — Jefferson IP Law, LLP

(57) ABSTRACT

In some embodiments, an entry management module may receive a set of entries, each entry of the set of entries including a time-stamp value and a path identifier to a data object having content that may be changed. An entry selection module may select a first entry from the set of entries based on a first time-stamp value of the first entry, the first time-stamp value identifying a first time being no later than other times identified by time-stamp values of other entries. A crawler module may retrieve first content from a first data object using a first path identifier of the first entry. A freshness module may calculate a first updated timestamp value using a first freshness value, the first freshness value indicating a priority to retrieve possibly changed content from the first data object, the first updated time-stamp value replacing the first time-stamp value.

17 Claims, 8 Drawing Sheets

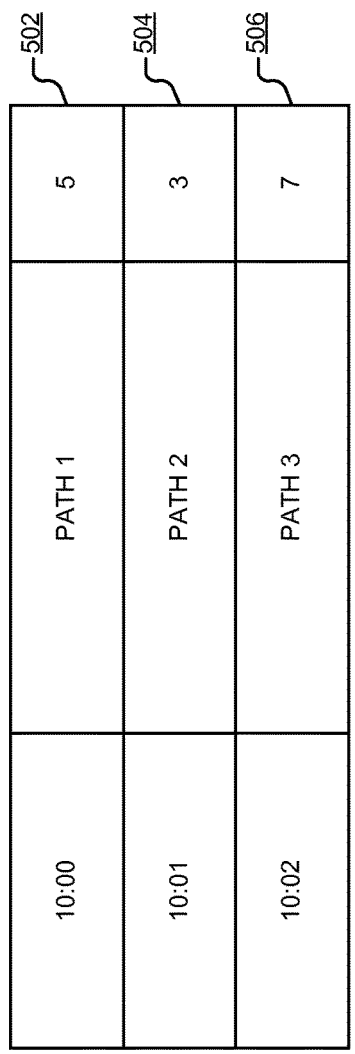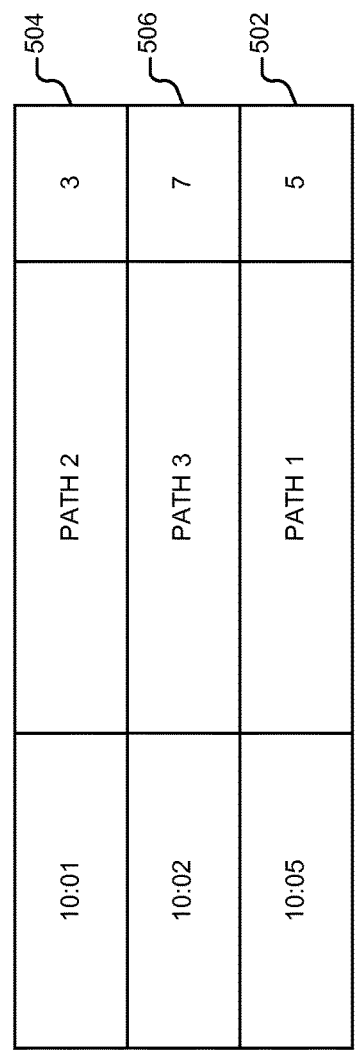
FIG. 5A
FIG. 5B

| 10:05 | PATH 1 | 5 ← 502 |
|---|---|---|
| 10:04 | PATH 2 | 3 ← 504 |
| 10:02 | PATH 3 | 7 ← 506 |

FIG. 5C

| 10:04 | PATH 2 | 3 ← 504 |
|---|---|---|
| 10:05 | PATH 1 | 5 ← 502 |
| 10:09 | PATH 3 | 7 ← 506 |

FIG. 5D

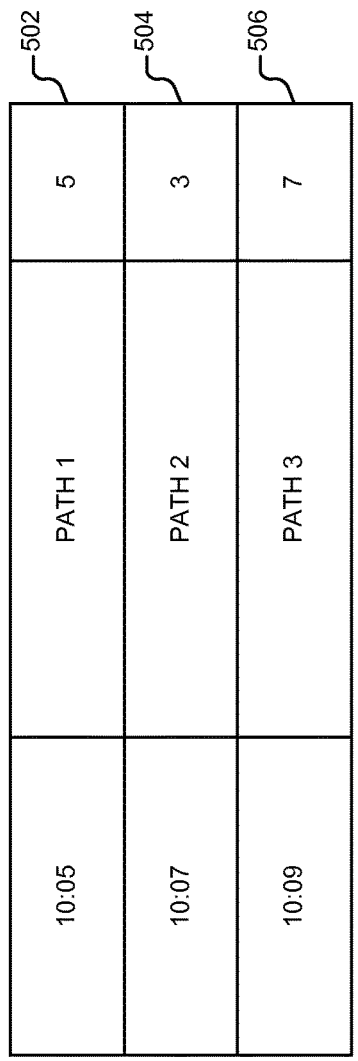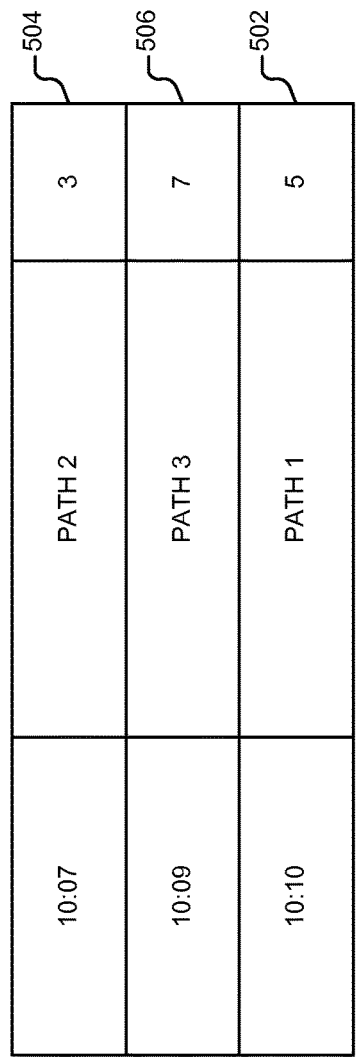

NETWORK CRAWLING PRIORITIZATION

TECHNICAL FIELD

The disclosure generally relates to network crawling. More particularly, the disclosure relates to techniques for prioritizing crawling of sites on a network.

BACKGROUND

As both the usage and size of the Internet has increased, the importance of providing fresh and relevant web content has also increased. Web crawlers are often used to crawl path identifiers, such as Uniform Resource Locators (URLs), to index and copy web content associated with the path identifiers. The web content associated with the path identifiers may then be processed by a search engine. A web crawler may crawl path identifiers according to a path identifier list. The path identifier list typically provides an order in which the path identifiers are to be crawled by the web crawler. After a page associated with a path identifier is crawled, the path identifier is often added to the end of the path identifier list. The web crawler may re-crawl the page when the web crawler reaches the end of the list to identify changes and new content.

Current systems order the path identifier list utilizing common ordering methods such as a "first in first out" (FIFO) or "last in first out" (LIFO) order. The web crawler may crawl each identifier based on the ordering method. While these methods provide an order for the path identifier list, they do not provide any priority to the listed path identifiers. As a result, path identifiers associated with web content deemed to be of higher importance and/or known to be regularly updated will be crawled at the same rate as other path identifiers in the path identifier list that may identify web content deemed to be less important and/or known to be rarely modified.

To provide prioritization of the path identifiers in the path identifier list, some systems order the path identifier list according to priority values. For example, each path identifier may be assigned a priority value between 1 and 100 and path identifiers may be selected from the path identifier list in an order corresponding to their assigned priority values. As a result, path identifiers assigned a higher priority value will always be crawled before path identifiers assigned a lower priority value. Unfortunately, these types of methods often lead to "starvation" of some of the listed path identifiers. For example, path identifiers assigned a low priority value may never be crawled by the web crawler due to path identifiers with a higher priority value continually being taking precedence and/or being added to the path identifier list.

As a result of these techniques and others, web crawlers are often limited in their ability.

SUMMARY OF EMBODIMENTS

In some embodiments, a system comprises an entry management module, an entry selection module, a crawler module and a freshness module. The entry management module may be configured to receive a set of entries, each entry of the set of entries including a time-stamp value and a path identifier to a data object having content that may be changed. The entry selection module may be configured to select a first entry from the set of entries based on a first time-stamp value of the first entry, the first time-stamp value identifying a first time being no later than other times identified by time-stamp values of other entries of the set of entries. The crawler module may be configured to retrieve first content from a first data object using a first path identifier of the first entry. The freshness module may be configured to calculate a first updated timestamp value using a first freshness value, the first freshness value indicating a priority to retrieve possibly changed content from the first data object, the first updated time-stamp value replacing the first time-stamp value.

In various embodiments, the system may comprise a processor and memory. The entry management module, the entry selection module, the crawler module and/or the freshness module may be resident in memory. In some embodiments, the selection module controls the processor to receive a set of entries, each entry of the set of entries including a time-stamp value and a path identifier to a data object having content that may be changed. In some embodiments, the entry selection module controls the processor to select a first entry from the set of entries based on a first time-stamp value of the first entry, the first time-stamp value identifying a first time being no later than other times identified by time-stamp values of other entries of the set of entries. The crawler module may control the processor to retrieve first content from a first data object using a first path identifier of the first entry. The freshness module may control the processor to calculate a first updated timestamp value using a first freshness value, the first freshness value indicating a priority to retrieve possibly changed content from the first data object, the first updated time-stamp value replacing the first time-stamp value.

In some embodiments, the first updated time-stamp value is calculated by adding the freshness value to a time when the first content was retrieved. In some embodiments, the crawler module may be further configured to store the first content retrieved from the first data object. In some embodiments, the crawler module may be configured to analyze the first content for a new path identifier not included in any entry in the set of entries. In some embodiments, the system may comprise an entry creation module configured to add a new entry to the list of entries upon a determination that the first content includes a new path identifier, the new entry including the new path identifier and a third time-stamp value. In some embodiments, the third time-stamp value is set based on a time when the new entry is created. In some embodiments, the entry selection module is further configured to determine that the first time-stamp value is no later than a time when the first entry was selected.

An example method may comprise receiving a set of entries, each entry of the set of entries including a time-stamp value and a path identifier to a data object having content that may be changed. The method may further comprise selecting a first entry from the set of entries based on a first time-stamp value of the first entry, the first time-stamp value identifying a first time being no later than other times identified by time-stamp values of other entries of the set of entries, retrieving first content from a first data object using a first path identifier of the first entry, and calculating a first updated timestamp value using a first freshness value, the first freshness value indicating a priority to retrieve possibly changed content from the first data object, the first updated time-stamp value replacing the first time-stamp value.

An example non-transitory computer readable medium may comprise executable instructions. The instructions may be executable by a processor to perform a method. The method may comprise receiving a set of entries, each entry of the set of entries including a time-stamp value and a path identifier to a data object having content that may be changed. The method may further comprise selecting a first entry from the set of entries based on a first time-stamp value of the first entry, the first time-stamp value identifying a first time being no later than other times identified by time-stamp values of other entries of the set of entries, retrieving first content from a first data object using a first path identifier of the first entry, and calculating a first updated timestamp value using a first freshness value, the first freshness value indicating a priority to retrieve possibly changed content from the first data object, the first updated time-stamp value replacing the first time-stamp value.

BRIEF DESCRIPTION OF THE DRAWINGS

FIGS. 5A-5F depict entries in a path identifier list in some embodiments.

DETAILED DESCRIPTION OF EMBODIMENTS

Figure 1:
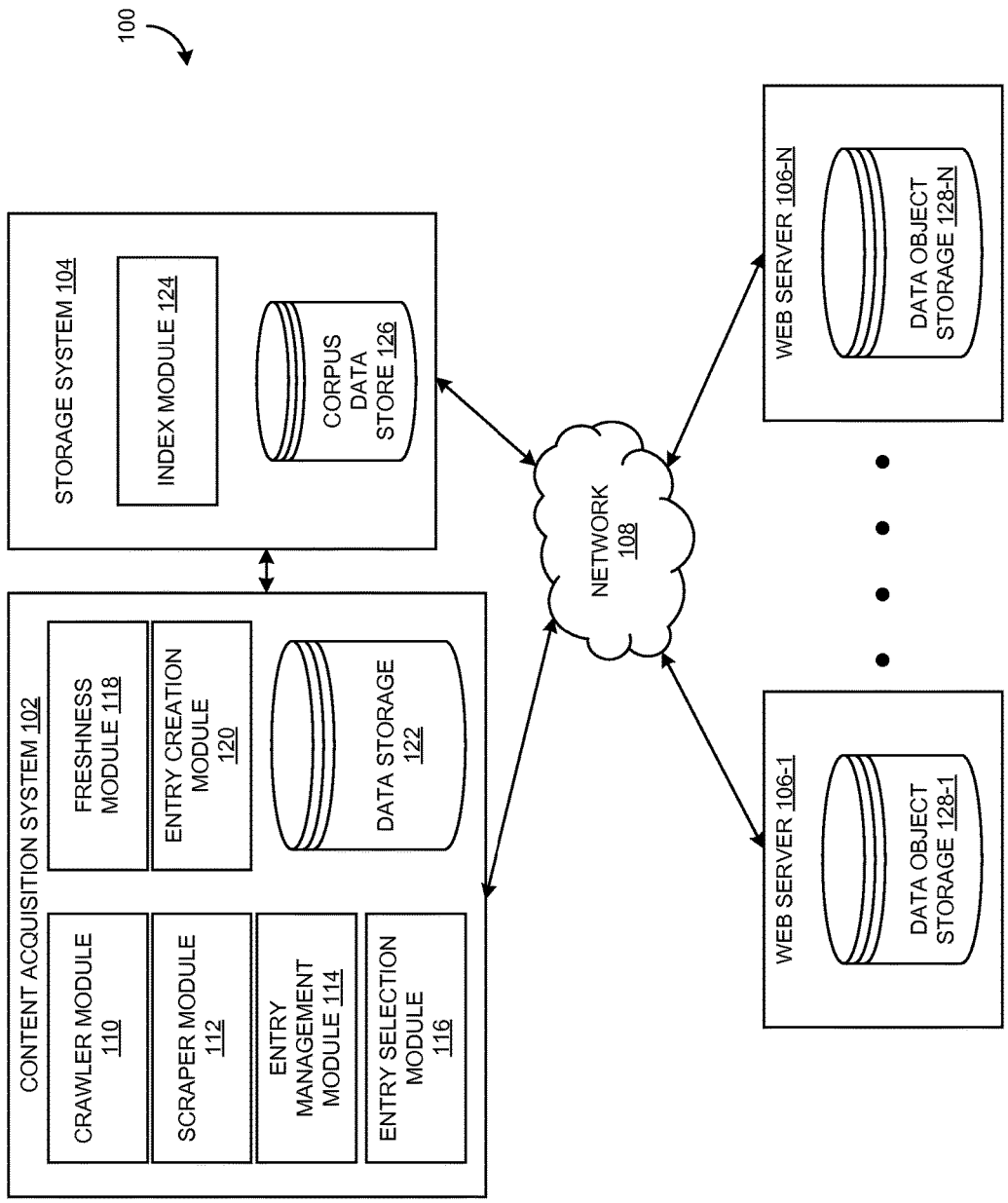
FIG. 1 is a block diagram of an example environment in some embodiments.

A content acquisition system may be configured to crawl and/or scrape path identifiers selected from a path identifier list. A path identifier may identify a location of a data object (e.g., containing web content) maintained by a web server in network communication with the content acquisition system. Path identifiers may be selected to be crawled from the path identifier list based on a time-stamp value assigned to each path identifier in the path identifier list. For example, each entry in the path identifier list may include one or more path identifiers and a time-stamp value assigned to the path identifier(s). Time-stamp values may be or include any value associated with time. For example, a time-stamp value may indicate a time that may be measured by milliseconds, microseconds, seconds, minutes, hours, days, or any other units associated with time. A time-stamp value may be a time (e.g., 10:04 AM) or be a value that indicates a duration of time (e.g., 25 seconds from the current time of the content acquisition system). In another example, a time-stamp value may be a date (e.g., 25 December or 25 Dec. 2014) or include both time and a date.

The time-stamp values may provide an order to the path identifier list by indicating a time at which each listed path identifier will mature (e.g., be eligible to be crawled and/or the data object associated with the path identifier scraped). In various embodiments, the content acquisition system may select path identifiers from the path identifier list based on an assigned time-stamp value. In one example, the crawler may include a clock or receive a clock signal indicating a current time (i.e., a current time of the crawler). The crawler may, in some embodiments, select a particular path identifier when the current time of the crawler is equal (or equate) to a time-stamp value associated with the particular path identifier. The content acquisition system may crawl the selected path identifier after or when the path identifier is determined to be mature. Subsequently, a content object associated with the matured, selected path identifier may be scraped.

As each path identifier is crawled and/or the associated data object to each path identifier scraped, the content acquisition system may calculate an updated time-stamp value for the path identifier. As a result, the content acquisition system reschedules the path identifier to be crawled and/or the associated data object to be scraped again at a later time according to the updated time-stamp value.

The content acquisition system may calculate the updated time-stamp value for a crawled path identifier based on a freshness value associated with the path identifier. The freshness value may be a value (e.g., quantitative or qualitative) that indicates a priority to retrieve possibly changed content from the data object associated with the path identifier. In one example, the content acquisition system may calculate an updated time-stamp value associated with a particular path identifier based on the time of the content acquisition system when the particular path identifier was crawled and/or scraped and the freshness value associated with the particular path identifier.

In some embodiments, the content acquisition system will calculate updated time-stamp values to be no earlier than a current time value (e.g., equal to or later than the current time value). The current time value may be a current time and/or date of the content acquisition system (e.g., 9:02 AM, or 25 Dec. 2014, 10:07 AM). Path identifiers may not be scheduled to be crawled again by the content acquisition system before newly mature path identifiers in the path identifier list (e.g., path identifiers with a time-stamp value that are earlier than and/or equal to the current time value). This may ensure that each entry will maintain its order in the path identifier list once the path identifier becomes mature (e.g., path identifiers may not be scheduled ahead of a currently mature path identifier). Each path identifier may be crawled and/or the associated data object of the path identifier scraped in the order in which the path identifier becomes mature. As a result, path identifiers may not go stale.

FIG. 1 is a block diagram of an example environment 100. The environment 100 includes a content acquisition system 102, a storage system 104, and web servers 106 in communication over a network 108. As illustrated, multiple computing devices may be connected to the network 108 and be configured to communicate with each other through use of the network 108. The network 108 may be any type of network, including but not limited to a local area network ("LAN"), such as an intranet, a wide area network ("WAN"), such as the Internet, or any combination thereof. Further, the network 108 may be a public network, a private network, or a combination thereof. The network 108 may also be implemented using any number of communications links associated with one or more service providers, including one or more wired communication links, one or more wireless communication links, or any combination thereof. Additionally, the network 108 may be configured to support the transmission of data formatted using any number of protocols.

Multiple computing devices may be connected over the network 108. A computing device may be any type of general computing device (e.g., a device with a processor and memory) capable of network communication with other computing devices. For example, a computing device may be a personal computing device such as a desktop or workstation, a business server, or a portable computing device, such as a laptop, smart phone, or a tablet PC. A computing device may include some or all of the features, components, and peripherals of the digital device 600 of FIG. 6. To facilitate communication with other computing devices, a computing device may also include a communication interface configured to receive a communication (e.g., a request, data, or the like) from another computing device in network communication and pass the communication along to an appropriate module running on the computing device. The communication interface may also be configured to send a communication to another computing device in network communication with the computing device.

The content acquisition system 102, storage system 104 and web servers 106 may each include or be any number of computing devices. At a high level, the content acquisition system 102 may crawl different computing devices over the network 108 using path identifiers. The content acquisition system 102 or another system may subsequently scrape data objects maintained by web servers 106. Crawling a path identifier may include accessing the data object associated with the path identifier (e.g., the path identifier identifying a network location of the associated data object). Scraping the data object associated with a path identifier may include copying content from and/or indexing content of the data object. A data object may be, for example, a website or webpage and the path identifier may be a URL identifying the location of the website or webpage.

In some embodiments, a data object may be an application listing (e.g., a page or card) identifying and/or describing a software application available for download by a digital distribution platform (e.g., GOOGLE PLAY STORE). A software application may refer to computer software that causes a computing device to perform a task. In some examples, a software application may be referred to as an "application," an "app," or a "program." Example applications include, but are not limited to, word processing applications, spreadsheet applications, messaging applications, media streaming applications, social networking applications, and games.

Applications can be executed on a variety of different computing devices. For example, applications can be executed on mobile computing devices such as smart phones, tablets, and wearable computing devices (e.g., headsets and/or watches). Applications can also be executed on other types of computing devices having other form factors such as laptop computers, desktop computers, or other consumer electronic devices. In some examples, applications may be installed on a computing device prior to a user purchasing the computing device. In other examples, the user may download and install applications on the computing device.

The functionality of an application may be accessed on the computing device on which the application is installed. Additionally, or alternatively, the functionality of an application may be accessed via a remote computing device. In some examples, all of an application's functionality is included on the computing device on which the application is installed. These applications may function without communication with other computing devices (e.g., via the Internet). In other examples, an application installed on a computing device may access information from other remote computing devices during operation. For example, a weather application installed on a computing device may access the latest weather information via the Internet and display the accessed weather information to the user through the installed weather application. In still other examples, an application (e.g., a web-based application) may be partially executed by the user's computing device and partially executed by a remote computing device. For example, a web application may be an application that is executed, at least in part, by a web server and accessed by a web browser of the user's computing device. Example web applications may include, but are not limited to, web-based email, online auctions, and online retail sites.

The digital distribution platform may be configured to distribute applications and/or otherwise provide information regarding downloadable applications. Example digital distribution platforms include, but are not limited to, GOOGLE PLAY® developed by GOOGLE INC., the APP STORE® developed by APPLE INC., and WINDOWS PHONE STORE® developed by MICROSOFT CORPORATION. The path identifier may identify the location of the application listing on a digital distribution platform.

The content acquisition system 102 may use the path identifier to locate and crawl to (e.g., navigate to access) the data object associated with the path identifier and/or may scrape content from the data object. The content acquisition system 102 may store the scraped content in a data store such as the corpus data store 126 of the storage system 104. In some embodiments, the content maintained by the storage system 104 may be used to provide search results to requesting users.

The content acquisition system 102 may comprise a crawler module 110, a scraper module 112, an entry management module 114, an entry selection module 116, a freshness module 118, an entry creation module 120, and a data storage 122. The crawler module 110 may be configured to crawl path identifiers and the scraper module 112 configured to scrape data objects at network locations identified by the path identifiers. For example, the crawler module 110 may be configured to communicate with the web servers 106-1 . . . 106-N to access a data object associated with a path identifier. The path identifier (e.g., a URL), for example, may identify the location of the data object maintained by web server 106-1 (e.g., located in data object storage 128-1). Each web server 106-1 . . . 106-N may include a data object storage 128 configured to store any number of data objects.

In response to receiving a request from the content acquisition system 102 for a data object associated with a path identifier, the web server 106-1 may locate the requested data object in the data object storage 128-1 and provide the data object (or content of the data object) to the content acquisition system 102. The crawler module 110 and/or the scraper module 112 may index all or some content from the data object. In some embodiments, the scraper module 112 may scrape content of the received data object and store the scraped content in the storage system 104 (e.g., in the corpus data store 126).

In some embodiments, the content acquisition system 102 may crawl path identifiers selected from a path identifier list. A path identifier list may include a set of (e.g., one or more) entries. Each entry of the path identifier list may include one or more path identifier(s) and a time-stamp value. The time-stamp value may indicate a time at which one or more path identifiers will mature (e.g., will become eligible to be crawled and/or scraped). The time-stamp value may indicate an order in which the path identifiers in the path identifier list are to be crawled and/or scraped by the content acquisition system 102. The content acquisition system 102 may store the path identifier list in data storage 122.

Although the path identifier list is identified as a list, it will be appreciate that the path identifier list may be or include any of a variety of data structures. For example, the path identifier list may include, but is not limited to, a priority queue such as a heap, unordered array, binary search tree, and/or the like. For example, each node of the priority queue may include one or more path identifies and a time-stamp value. In some embodiments, each node may include one or more path identifiers and a pointer to a time-stamp value. For example, a listing of time-stamp values may be maintained as a separate object from the path identifier list and each node of the path identifier list may include a pointer to a time-stamp value in the listing of time-stamp values.

In some embodiments, path identifiers in the path identifier list may be ordered according to the time-stamp values assigned to the path identifiers. For example, the path identifier list may be ordered starting from the path identifiers assigned the earliest time-stamp value to the path identifiers assigned the latest time-stamp value. In this example, the head of the path identifier list includes the path identifiers assigned the earliest time-stamp value in the path identifier list and the tail of the path identifier list includes the path identifiers assigned the latest time-stamp value in the path identifier list. New path identifiers may be positioned in the path identifier list according to an assigned time-stamp value. For example, path identifiers added to the path identifier list may be ordered within the path identifier list according to the time-stamp value assigned to the path identifiers, rather than the path identifiers always being added to the end of the path identifier list.

It will be appreciated that the path identifiers in the path identifier list may not be physically ordered but may be logically ordered based on the time-stamp values. For example, path identifiers may be selected from the path identifier list based, at least in part, on their assigned time-stamp values.

In some embodiments, the path identifier list may be initialized or set by an administrator or other operator, authorized user, or the like. For example, the content acquisition system 102 may include an entry management module 114 configured to enable a user to create and/or initialize the path identifier list. The entry management module 114 may provide a management interface that enables users to provide any number of path identifiers to create and/or initialize a path identifier list.

In one example, a user may communicate with the content acquisition system 102 using a client device (not shown) in network communication with the content acquisition system 102 to access the management interface provided by the entry management module 114. A client device may be any digital device controlled by a user (e.g., a person). For example, the user may communicate with the content acquisition system 102 using an application installed on the client device, such as a content acquisition system specific application configured to communicate with the content acquisition system 102. Alternatively, the user may communicate with the content acquisition system 102 using a non-content acquisition system specific application installed on the client device, such as a web browser, that enables the client device to communicate with other computing devices in network communication with the client device. In some embodiments, a user may login to the content acquisition system 102 directly via a computing device used to implement the content acquisition system 102 to access the management interface.

The management interface may enable the user to enter, import, update, remove, or the like, one or more entries of the path identifier list. For example, the management interface may enable a user to add path identifier(s), to update path identifier(s) of, or remove path identifier(s) from the path identifier list. The management interface may also enable a user to assign a time-stamp value to, update a time-stamp value of, or remove a time-stamp value from the path identifier list. In some embodiments, the management interface may enable a user to import a list of path identifiers to add to the path identifier list, such as from a spreadsheet or similar type file that includes the path identifiers. The imported list may, in some embodiments, include time-stamp values corresponding to the listed path identifiers.

In various embodiments, the entry management module 114 may be configured to assign time-stamp values to the path identifiers, rather than the user specifying the time-stamp values. For example, the entry management module 114 may assign a time-stamp value to new or existing path identifiers of the path identifier list based on a current time value of the content acquisition system 102. The entry management module 114 may, for example, assign time-stamp values equal to or substantially equal to a current time value at which the path identifier is added or changed (e.g., modified or updated). The entry management module 114 may determine the current time value from an internal clock of the content acquisition system 102. In some embodiments, the entry management module 114 may determine the current time value from any clock including a remote clock (e.g., via the network).

In some embodiments, the entry management module 114 may assign different time-stamp values to different path identifiers based on the data objects associated with each different path identifier. For example, the entry management module 114 may assign an earlier time-stamp value (e.g., equal to or substantially equal to the current time value) to path identifiers associated with (e.g., the path identifier providing a location of) a data object considered to be of great importance or high priority. In some embodiments, a data object such as a page identifying an application listing for a new application recently available for download from a digital distribution platform may be considered significant and thus the entry management module 114 may assign an earlier time-stamp value to the path identifier associated with the application listing. In some embodiments, it may be required that the time-stamp value be no earlier than a current time value (e.g., the time-stamp value is not in the past). The entry management module 114 may assign a later time-stamp value when a path identifier is associated with a data object considered to be of lower importance or lower priority.

Assigning a time-stamp value based on the current time value and/or importance of a related data object are just two examples of assigning a time-stamp value to an entry in the path identifier list and are not meant to be limiting. It will be appreciated that the entry management module 114 may be configured to assign the time-stamp value in any number of ways or based on any number on factors. In some embodiments, the entry management module 114 may assign time-stamp values that are equal to or later than a current time value.

The entry management module 114 may communicate with the data storage 122 to create entries and/or initialize a path identifier list. This may include creating a new object to implement the path identifier list (e.g., a priority queue such as a heap) and creating entries in the path identifier list including path identifiers (e.g., received from one or more user(s), database(s), administrator(s), or digital device(s)). Each entry may include one or more of the added path identifiers and one or more time-stamp value(s) corresponding to any number of the path identifier(s). The path identifiers in the path identifier list may be logically ordered according to the time-stamp values assigned to the path identifier list.

The entry management module 114 may also enable a user to modify or remove entries from an existing path identifier list. For example, the entry management module 114 may allow the user access to the path identifier list from the data storage 122. One or more entries from the path identifier list may be displayed to the user via the management interface. A user may select to add a new entry to the path identifier list or remove or modify existing entries from the path identifier list. The entry management module 114 may communicate with the data storage 122 to modify the path identifier list (i.e., add, remove, modify entries) according to the user's selections.

In some embodiments, the entry management module 114 may restrict a user from assigning a time-stamp value that is earlier than a current time value. For example, a user may attempt to add an entry or modify an entry in the path identifier list to change the time-stamp value to a value that indicates a time that has already lapsed (e.g., is earlier than a current time value). The entry management module 114 may deny such requests and prompt the user to provide a time-stamp value that is equal to or later than the current time value. It will be appreciated that, in various embodiments, the entry management module 114 denies requests from users to add or modify an entry to change the time-stamp value to a value that indicates a time that is earlier than a current time value (e.g., a time that has already lapsed) in order to guarantee a starvation-free data structure. In various embodiments, the entry management module 114 may automatically assign a time-stamp value that is equal to or later than the current time value.

The entry selection module 116 may be configured to select path identifiers from the path identifier list and provide the selected path identifiers to the crawler module 110 to be crawled and/or the scraper module 112 for the associated data object to be scraped. The entry selection module 116 may communicate with the data storage 122 to access and select path identifiers from the path identifier list based on the time-stamp values assigned to or otherwise associated with the path identifiers. In one example, the entry selection module 116 may select the path identifier(s) with the earliest time-stamp value. In some embodiments, the entry selection module 116 may select the path identifier(s) with the time-stamp value that is equal to (or substantially equal to) the current time of the content acquisition system 102.

The entry selection module 116 may select path identifier(s) with time-stamp value(s) that have lapsed. In one example, the crawler module 110 may be too busy to crawl all path identifier(s) that have matured (e.g., with time-stamp value(s) equal to or substantially equal to the current time of the content acquisition system 102). As a result, some of the path identifier(s) may be associated with time-stamp value(s) that indicate a time that is in the past when compared to the current time of the content acquisition system 102. The entry selection module 116 may select such path identifier(s) as if the time-stamp value(s) are equal to the current time in order to allow the crawler module 110 to catch up.

In some embodiments, the entry selection module 116 may analyze the time-stamp values for multiple entries in the path identifier list to identify the path identifier(s) with the earliest time-stamp value. In various embodiments, the entries in the path identifier list may be ordered based on the time-stamp value assigned to each entry in the path identifier list and the entry selection module 116 may access, pop, dequeue, or the like, the head of the path identifier list to select the entry with the earliest time-stamp value.

In instances where multiple entries in the path identifier list are assigned matching time-stamp values that are the earliest time-stamp value, the entry selection module 116 may select from the entries with matching time-stamp values in any number of ways. For example, the entry selection module 116 may select from the entries at random, using a FIFO order, using a LIFO order, or in any other manner.

In some embodiments, after selecting a path identifier from the path identifier list, the entry selection module 116 may determine whether the selected path identifier is mature and, if so, provide the selected path identifier to the crawler module 110 to be crawled and/or the scraper module 112 to assist in scraping all or a part of the associated data object. To determine whether selected path identifiers are mature, the entry selection module 116 may determine whether a current time value is equal to or later than the time-stamp value assigned to the path identifiers. For example, the entry selection module 116 may obtain a current time value from an internal clock of the content acquisition system 102 and compare the current time value to the time-stamp value assigned to the one or more path identifiers to determine whether the path identifiers are mature. If the current time value is equal to or later than the time-stamp value, the entry selection module 116 may determine that the one or more path identifiers are mature. Alternatively, if the entry selection module 116 determines that the current time value is not equal to or later than the time-stamp value (e.g., the time-stamp value is later than the current time value), the entry selection module 116 may determine that the one or more path identifiers are not mature. For example, an attempt to dequeue (e.g., pop) an entry from the path identifier list may return zero results, indicating that there are no mature entries in the path identifier list, although there may be non-mature entries included in the path identifier list.

If the entry selection module 116 determines that selected path identifiers are not mature (e.g., not eligible to be crawled) the entry selection module 116 may, in some embodiments, pause for a predetermined amount of time during which the entry selection module 116 does not select path identifiers from the path identifier list. After the entry selection module 116 concludes a pause (e.g., for the predetermined amount of time), the entry selection module 116 may resume selecting path identifiers from the path identifier list and/or determining whether a selected entry is mature.

After a path identifier has been crawled by the crawler module 110 and/or the associated data object scraped, the content acquisition system 102 may be configured to calculate an updated time-stamp value for that path identifier, thereby ensuring that the path identifier will be crawled and/or scraped again at a later time. The content acquisition system 102 may include a freshness module 118 configured to calculate an updated time-stamp value for one or more path identifiers. The freshness module 118 may calculate an updated time-stamp value for a path identifier based on a freshness value. A freshness value is any value (e.g., quantitative or qualitative) that may be used to assist in the assignment of an updated time-stamp value.

A freshness value may indicate a desired priority. In various embodiments, the freshness value is a component used for the generation of an updated time-stamp value (e.g., the freshness value may be used in a function to generate the updated time-stamp value). The updated time-stamp value indicates when the associated path identifier is to be re-crawled and/or the data object associated with the path identifier is re-scraped (e.g., to possibly retrieve changed content). It will be appreciated that the freshness value may indicate a desired frequency to re-crawl the path identifier and/or re-scrape the content object.

The freshness value may be used to generate an updated time-stamp value in any number of ways. In one example, the freshness value associated with a path identifier may be a predetermined period of time that may be added to a current time of the content acquisition system 102 (or any time), added to a time when the path identifier was last crawled, or subtracted from another time-stamp value. In various embodiments, the freshness value may be used to assign or assist in assigning new time-stamp values to new path identifiers added to the path identifier list.

Different path identifiers may be associated with different freshness values. For example, it may be desired that some path identifiers associated with identify data objects that are considered to be more important and/or that are known to be regularly modified are crawled and/or scraped more often than other path identifiers. The freshness value associated with a path identifier may indicate a desired frequency rate at which the path identifier is to be crawled and/or scraped by the content acquisition system 102.

In some embodiments, the freshness value associated with a path identifier may represent a delta value used to calculate the updated time-stamp value. For example, the freshness module 118 may calculate the updated time-stamp value by adding the delta value (e.g., the freshness value) to the time that the path identifier was last crawled to create an updated time-stamp value. Path identifiers (and/or their associated data objects) deemed higher priority may be associated with freshness values representing a shorter delta value than the freshness values associated with path identifiers (and/or their associated data objects) deemed lower priority. As a result, for example, path identifiers deemed higher priority will be crawled and/or the associated data objects scraped at a higher frequency (e.g., more often) than path identifiers deemed to be of lower priority.

In various embodiments, the freshness value associated with a path identifier may be or include a delta value that is added to the current time of the content acquisition system 102 to calculate the updated time-stamp value. For example, the freshness value may be or represent a specified time increment and the freshness module 118 may generate the updated time-stamp value for a path identifier by adding the specified time increment to the current time of the content acquisition system 102. It will be appreciate that, in some embodiments, the delta value may be added to the time-stamp value when the path identifier should have last been crawled (e.g., when the path identifier time-stamp value matured).

Each freshness value associated with each path identifier may point to or otherwise identify one of the set of predetermined delta values to calculate or assist in calculating an updated time-stamp value for the path identifier. For example, the freshness value may correspond to one of a plurality of specified time increments and the freshness module 118 may use the freshness value to locate the corresponding delta value, which may be used to calculate the updated time-stamp value for the path identifier. In another example, the content acquisition system 102 may maintain a listing of specified time increments, and the freshness value may correspond to one of the specified time increments included in the listing of specified time increments. The listing of specified time increments, for example, may list specified time increments and a corresponding priority level for the specified time increments. The freshness value may indicate one of the priority levels and the freshness module 118 may use the freshness value to identify the specified time increment that corresponds to the freshness value.

A freshness value indicating a higher priority may correspond to a shorter specified time increment than a freshness value indicating a lower priority. To calculate an updated time-stamp value for a path identifier, the freshness module 118 may identify the specified time increment corresponding to the freshness value associated with the path identifier. The freshness module 118 may then calculate the updated time-stamp value for the path identifier based on the specified time increment. For example, the freshness module 118 may calculate the updated time-stamp value by adding the specified time increment to the previous time-stamp value of the path identifier or, alternatively, a current time value. The freshness module 118 may obtain a current time value from an internal clock of the content acquisition system 102.

In some embodiments, the freshness value may be or may correspond to a weight used to calculate the delta value and/or the updated time-stamp value. For example, the freshness value may indicate a weight to be applied to a standard time increment value used to generate the updated time-stamp value. The standard time increment value may be a specified time increment that is used by the freshness module 118 to generate the updated time-stamp value for any number of path identifiers.

The freshness module 118 may apply the weight to the standard time increment to calculate a delta value to assist in generating the updated time-stamp value for a path identifier. For example, the freshness module may apply the weight by multiplying the standard time value by the weight. Path identifiers deemed higher priority may be associated with a weight that is less than one, resulting in a delta value that is shorter than the standard time increment. Alternatively, path identifiers deemed lower priority may be associated with a weight that is greater than one, resulting in a delta value that is greater than the standard time increment. The freshness module 118 may calculate the delta value based on the standard time increment and the weight corresponding to the freshness value. The freshness module 118 may then calculate the updated time-stamp value based on the calculated delta value. For example, the freshness module 118 may calculate the updated time-stamp value by adding the calculated delta value to the previous time-stamp value of the path identifier or, alternatively a current time value.

Although examples of how the freshness module 118 may calculate an updated time-stamp value are described herein, these are only some possible examples and are not meant to be limiting. It will be appreciated that the freshness module 118 may calculate an updated time-stamp using any variety of functions. In some embodiments, the freshness module 118 may be configured to calculate an updated time-stamp value using a method that results in an updated time-stamp value that is no earlier than a current time value (e.g., equal to or later than the current time value).

In some embodiments, the freshness value associated with a path identifier may be included in a corresponding entry in the path identifier list. For example, each entry in the path identifier list may include a freshness value for the one or more path identifiers included in the entry. Alternatively, each entry of the path identifier list may include an identifier (e.g., a pointer) used to identify the freshness value. For example, the content acquisition system 102 may maintain a listing of freshness values and each entry in the path identifier list may include an identifier, such as a pointer, reference number, or the like, that identifies one of the freshness values included in the listing of freshness values. The freshness module 118 can use the identifier included in an entry to identify the freshness value assigned to the one or more path identifiers included in the entry.

In some embodiments, the freshness values associated with the path identifiers may be assigned by an administrator, operator, or other authorized user of the content acquisition system 102. The entry management module 114 may be configured to enable a user to provide the freshness values for the path identifiers in the path identifier list. For example, the entry management module 114 may enable a user to assign freshness value for path identifiers when the user initializes or adds an entry to the path identifier list. In some embodiments, the entry management module 114 may associate the freshness values with the entries in the path identifier list by adding the freshness values to corresponding entries in the path identifier list. Alternatively, the entry management module 114 may create a listing of freshness values and assign an identifier to the corresponding freshness value for each entry in the path identifier list.

In some embodiments, the content acquisition system 102 may determine the appropriate freshness values for the path identifiers in the path identifier list. For example, the freshness module 118 may be configured to determine the freshness value for each entry in the path identifier list based on the data objects associated with the path identifiers included in the entry.

In some embodiments, the freshness module 118 may determine the freshness values based on the types of data objects associated with the path identifiers. For example, data objects such as application listings that have been downloaded often, application listings that are in the top ten downloaded applications, have a number of reviews greater than a predetermined review threshold, application listings know to frequently release new updates, popular application listing that are released on a new application platform, trending application listings, and/or the like may be considered more important than other application listings that do not have one or more of the previously listed characteristics. Accordingly, the freshness module 118 may assign a freshness value indicating a higher priority to entries including path identifiers associated with application listings and a freshness value indicating a lower priority to the entries including path identifiers associated with web pages.

In some embodiments, the freshness module 118 may determine the freshness values for the entries based on the content types of the data objects associated with the path identifiers included in the entries. Content types that are deemed higher importance and/or are more likely to be modified may be considered higher priority than content types that are deemed less important and/or are less likely to be modified. For example, web pages providing reviews regarding restaurants may be visited more often and/or updated more frequently than web pages providing reviews of a city, and may thus be considered of higher priority than web pages providing reviews of a city. For example, the freshness module 118 may assign a freshness value indicating higher priority to web pages providing reviews of a restaurant and a freshness value indicating a lower priority to web pages providing reviews of a city, resulting in the web pages providing reviews of a restaurant being crawled and/or scraped more frequently than web pages providing reviews of a city.

As another example, applications that are known to frequently receive updates may be considered higher priority than applications know to infrequently receive updates. Accordingly, the freshness module 118 may assign a freshness value indicating higher priority to application listings for applications known to frequently receive updates and a freshness value indicating a lower priority to application listings for applications know to infrequently receive updates.

In some embodiments, the freshness module 118 may determine the freshness value for an entry based on the popularity of the data objects associated with the path identifiers included in the entry. For example, the popularity of a data object such as an application listing may be determined based on such characteristics including, but not limited to, an amount of feedback received in or by the data object, such as the number of downloads, positive comments, purchases, identification as a staff pick, followers, or the like. Likewise, the popularity of a data object such as web page providing restaurant reviews may be based on the number of followers, comments, ratings, and the like received by the restaurant. Data objects determined to be popular may be considered higher priority than data objects determined to be less popular. The freshness module 118 may assign freshness values indicating higher priority to entries associated with popular data objects and a freshness values indicating lower priority to entries associated with unpopular data objects.

In some embodiments, the freshness module 118 may determine the popularity of a data object based on the speed (e.g., acceleration) in which a data object receives comments, feedback, and the like. For example, if the number of comments received for a data object is increasing over a relatively short period of time, the freshness module 118 may determine that the data object is popular and thus assign a freshness value indicating higher priority to the corresponding entry in the path identifier list. Alternatively, if the number of comments received for a data object is slowing (e.g., decelerating), the freshness module 118 may determine that the data object is not popular or losing popularity.

In some embodiments, the freshness module 118 may determine the freshness value for an entry based on the popularity of a data object on a different application platform. For example, an application, may initially by released on a first application platform, such as IOS, prior to being released on other application platforms, such as ANDROID. An application listing for an application that is newly released on one application platform and that also performed well (e.g., highly downloaded) on a different application platform may be considered high priority. Application listings for other applications that are newly released on one application platform that either were not released on a different application platform or did not perform well on the different application platform may be considered low priority. Accordingly, the freshness module 118 may assign a freshness value indicating higher priority to application listings for applications that are newly released on one application platform and that also performed well on a different application platform.

The freshness module 118 may assign a freshness value to assist in preventing the same data object from being accessed and/or scraped too frequently. It will be appreciated that some pages may be subject to a site policy limiting the number of requests over a period of time to access and/or retrieve content from the page. For example, a web site may have a site policy indicating that a web page should or must only be accessed a limited number of times over a predetermined period of time. The web site may otherwise limit accessibility, provide an alert message, limit functionality, or the like if the web page is accessed in violation of its site policy. Similarly, a digital distribution platform may have a site policy that similarly limits access to an application listing.

The freshness module 118 may assign a freshness value such that the data object is not accessed too many times over a predetermined period of time. In one example, there may be any number of proxies that crawl and/or scrape content utilizing the path identifier list. The freshness value may be assigned to each path identifier in such a way that the content acquisition system 102 and/or content acquisition system proxies do not violate a site policy (e.g., do not invoke to requests to access a data object on the same site in less than N seconds). In some embodiments, the freshness module 118 may assign a freshness value to a path identifier based, in part, on the site policy associated with the path identifier's data object.

In addition to crawling the path identifiers listed in the path identifier list, the content acquisition system 102 may also be configured to identify new path identifiers and generate new entries in the path identifier list for the new path identifiers. For example, the crawler module 110 may identify new path identifiers embedded within content (i.e., hyperlinks) of a data object after crawling the path identifier. For example, the content acquisition system 102 may crawl to a data object containing previously unknown path identifiers to other, previously unknown, data objects. The content acquisition system 102 may create a new entry in the path identifier list for each identified path identifier that is not included in the path identifier list. For example, upon identifying an embedded path identifier that is not included in the path identifier list, the crawler module 110 may provide the path identifier to an entry creation module 120 configured to generate a new entry in the path identifier list.

The entry creation module 120 may communicate with the data storage 122 to add a new entry to the path identifier list. Each new entry created by the entry creation module 120 may include one or more path identifiers identified by the crawler module 110 that are not included in the path identifier list, and a time-stamp value for the path identifiers. In some embodiments, the entry creation module 120 may assign a time-stamp value (e.g., default time-stamp value) for the path identifier based on a current time value. For example, the entry creation module 120 may assign a time-stamp value that is equal to or substantially equal to the current time value. Assigning a time-stamp value that is substantially similar to the current time value may ensure that the new path identifiers will be crawled by the content acquisition system 102 shortly after the entry creation module 120 creates the entries in the path identifier list. In some embodiments, the entry creation module 120 may be required to assign a time-stamp value that is not earlier than the current time value.

In some embodiments, the content acquisition system 102 may assign a freshness value to the new entries added to the path identifier list. In one example, the freshness module 118 may determine a freshness value for a new path identifier based on the data objects associated with the path identifiers included in the entries, as described above. For example, if the content acquisition system 102 crawls a first path identifier and discovers a previously unknown second path identifier, the freshness module 118 and/or the entry creation module 120 may assign a freshness value to the second path identifier based on or is equal to the freshness value of the first path identifier.

The storage system 104 may be any computing device that includes an index module 124 and a corpus data store 126. All or part of the storage system 104 may be a part of the content acquisition system 102 or may be another computing device in communication with the content acquisition system 102. Although only one content acquisition system 102 is depicted in FIG. 1, there may be any number of content acquisition systems 102. The storage system 104 may receive data from any number of content acquisition systems 102. The storage system 104 may be local or remote to the content acquisition system 102.

The index module 124 may index all or some of the scraped content and/or content stored in the corpus data store 126 to allow for search, identification, and/or retrieval of content. The index module 124 may organize and/or index content stored by the corpus data store 126 in any number of ways. In various embodiments, the storage system 104 is configured to store from and/or provide content to any number of digital devices.

The data storage 122, corpus data store 126, and/or data object storage 128-1 . . . 128-N may include any number and any type(s) of data structures including databases, tables, queues, or the like. In some embodiments, the data storage 122 and the corpus data store 126 may be the same data store (e.g., when the content acquisition system 102 includes the storage system 104). In some embodiments, the data storage 122 and the corpus data store 126 may be components of a network storage system.

The modules and data stores described herein may be embodied by electronic hardware (e.g., hard wired such as part of an Application-Specific Integrated Circuit (ASIC)), software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

In some implementations, the content acquisition system 102 and/or storage system 104 may be a system of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the search system 300 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the content acquisition system 102 and/or storage system 104 may be configured to communicate with the network 108. The one or more computing devices of the content acquisition system 102 and/or storage system 104 may also be configured to communicate with one another (e.g., via a computer network). In some examples, the one or more computing devices of the content acquisition system 102 and/or storage system 104 may include one or more server computing devices configured to communicate with user devices (e.g., receive query wrappers and transmit search results), gather data from data sources, index data, store the data, and store other documents. The one or more computing devices may reside within a single machine at a single geographic location in some examples. In other examples, the one or more computing devices may reside within multiple machines at a single geographic location. In still other examples, the one or more computing devices of the content acquisition system 102 and/or storage system 104 may be distributed across a number of geographic locations.

Figure 2:
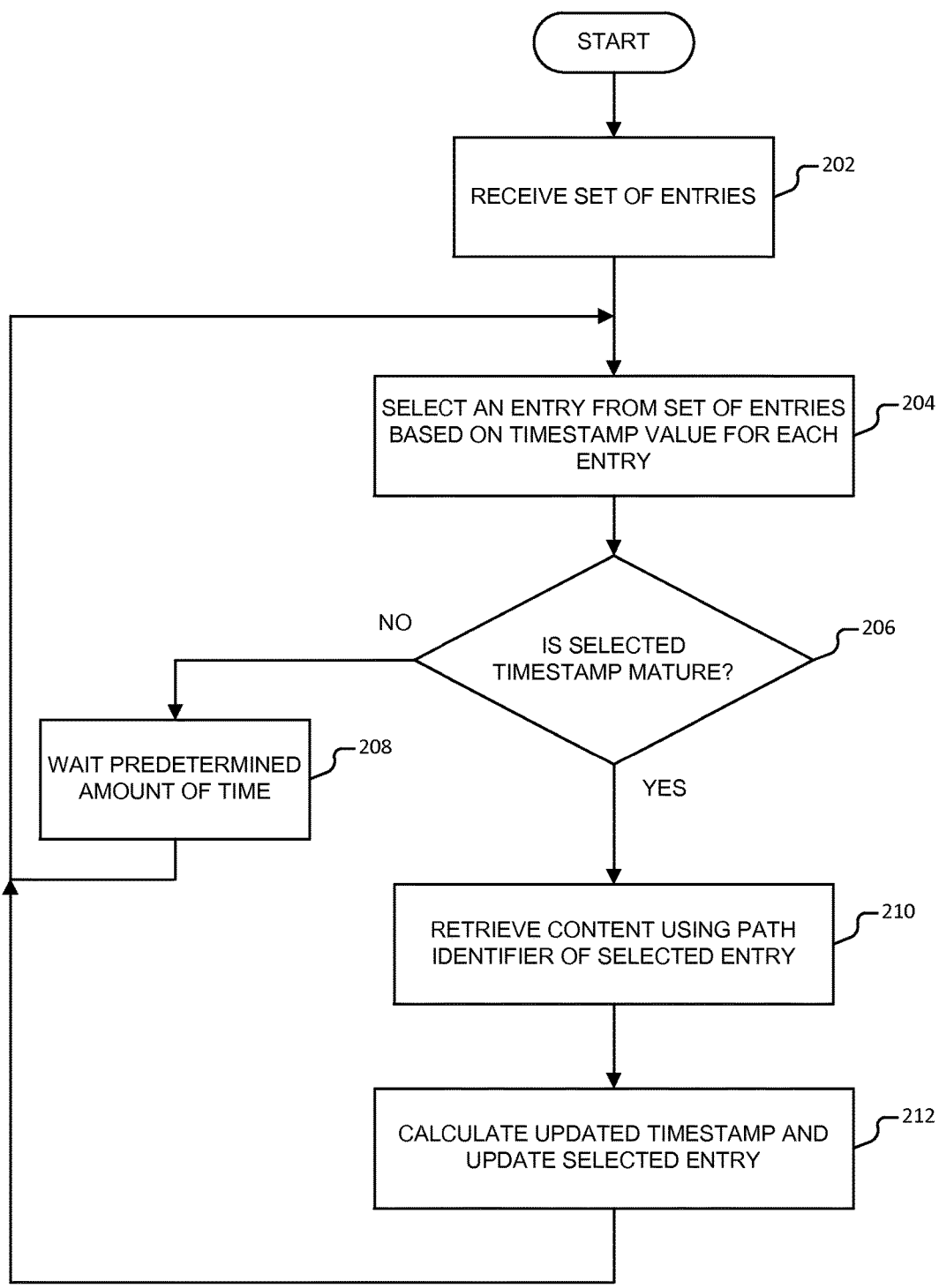
FIG. 2 is a flowchart of crawling path identifiers and scraping associated data objects based on time-stamp values in some embodiments.

FIG. 2 is a flowchart of crawling path identifiers and scraping associated data objects based on time-stamp values in some embodiments. In step 202, a content acquisition system 102 receives a set of entries (e.g., list of entries including path identifiers, time-stamp values, and/or freshness values). Each entry in the set of entries may include one or more path identifiers associated with data objects having content that may be changed. For example, a path identifier may be or include a URL that identifies the location of a webpage hosted by a web server 106-1. The webpage may have content that may be changed, for example, as an administrator of the webpage updates the content presented by the webpage. Alternatively, a data object may be an application listing that lists an application available for download from a digital distribution platform (e.g., GOOGLE PLAY STORE) and the path identifier may identify the location of the application listing. The application listing may have content that may be changed, for example, by users (e.g., leaving reviews), by analytics (e.g., the webpage includes statistics for application downloads or ratings), or content as an administrator (e.g., application developer) changes descriptions of an application. The set of entries may include entries that make up a path identifier list that lists path identifiers to be crawled navigating to data objects that are scraped by the content acquisition system 102.

In step 204, an entry selection module 116 may select an entry from the set of entries based on the time-stamp values for each entry. For example, the entry selection module 116 may select the entry that is the same as or is substantially similar to a current time of the content acquisition system 102. In some embodiments, the entry selection module 116 may select the entry that has the earliest time-stamp value.

In step 206, the entry selection module 116 may determine whether the selected time-stamp value is mature (i.e., eligible to be crawled). To determine whether the selected entry is mature, the entry selection module 116 may compare the time-stamp value assigned to the selected entry to a current time value (e.g., a clock or clock signal). The current time value may be obtained from an internal clock of the content acquisition system 102 and indicate the current time, such as the time at which the time-stamp value is compared to the current time value, the time when the entry was selected from the set of entries, or the like.

If the entry selection module 116 determines that the current time value is equal to or later than the time-stamp value, the entry selection module 116 may determine that the selected entry is mature. Alternatively, if the entry selection module 116 determines that the current time value is earlier than the time-stamp value, the entry selection module 116 may determine that the selected entry is not mature.

If the entry selection module 116 determines that the selected entry is not mature, the method may continue to step 208 where the entry selection module 116 may wait a predetermined amount of time. For example, if none of the path identifiers in a path identifier list are mature, the entry selection module 116 may pause for a predetermined amount time (e.g., milliseconds, seconds, minutes, hours, or any other amount of time) during which the entry selection module 116 does not select entries from the set of entries and/or determine whether a selected entry is mature. After the predetermined amount of time has lapsed, the method may return to step 204 where the entry selection module 116 selects an entry from the set of entries based on the time-stamp value for each entry.

If at step 206 the entry selection module 116 determines that the selected entry is mature, the method continues to step 210 where the crawler module 110 retrieves content using the path identifier of the selected entry. Retrieving the content may include dequeuing (e.g., popping) the path identifier from the path identifier list and crawling the data object identified by the path identifier. Further, in some embodiments, the scraper module 112 may scrape content from the data object.

At step 212, the freshness module 118 may calculate an updated time-stamp value for the selected entry and add the selected entry with the updated time-stamp value again to the set of entries. The freshness module 118 may calculate the updated time-stamp value for the selected entry based on a freshness value indicating the priority to retrieve possibly changing content from the data object associated with the path identifier.

The freshness module 118 may utilize a freshness value associated with a path identifier to identify a delta value that may be used to calculate the updated time-stamp value for the path identifier. For example, in some embodiments, the freshness value may be a delta value, such as a specified time increment used to calculate the updated time-stamp value (e.g., adding the specified time increment to a current time or a future time). Alternatively, the freshness value may correspond to one of a plurality of specified time increments and the freshness module 118 may use the freshness value to identify the corresponding specified time increment, which may subsequently be used to calculate the updated time-stamp value.

The freshness module 118 may calculate the updated time-stamp value from the freshness value using any method. For example, the freshness module 118 may calculate the updated time-stamp value by adding a specified time increment to a current time value. Alternatively, the freshness module 118 may calculate the updated time-stamp value by adding a specified time increment to the time-stamp value assigned to the selected entry. In some embodiments, the freshness module 118 may calculate the updated time-stamp value using any method or calculation that ensures that the updated time-stamp value is not earlier than the current time value.

The freshness module 118 may update the entry to replace an existing time-stamp value with the updated time-stamp value. The method may then return to step 204 where the entry selection module 116 may select another entry from the set of entries.

Figure 3:
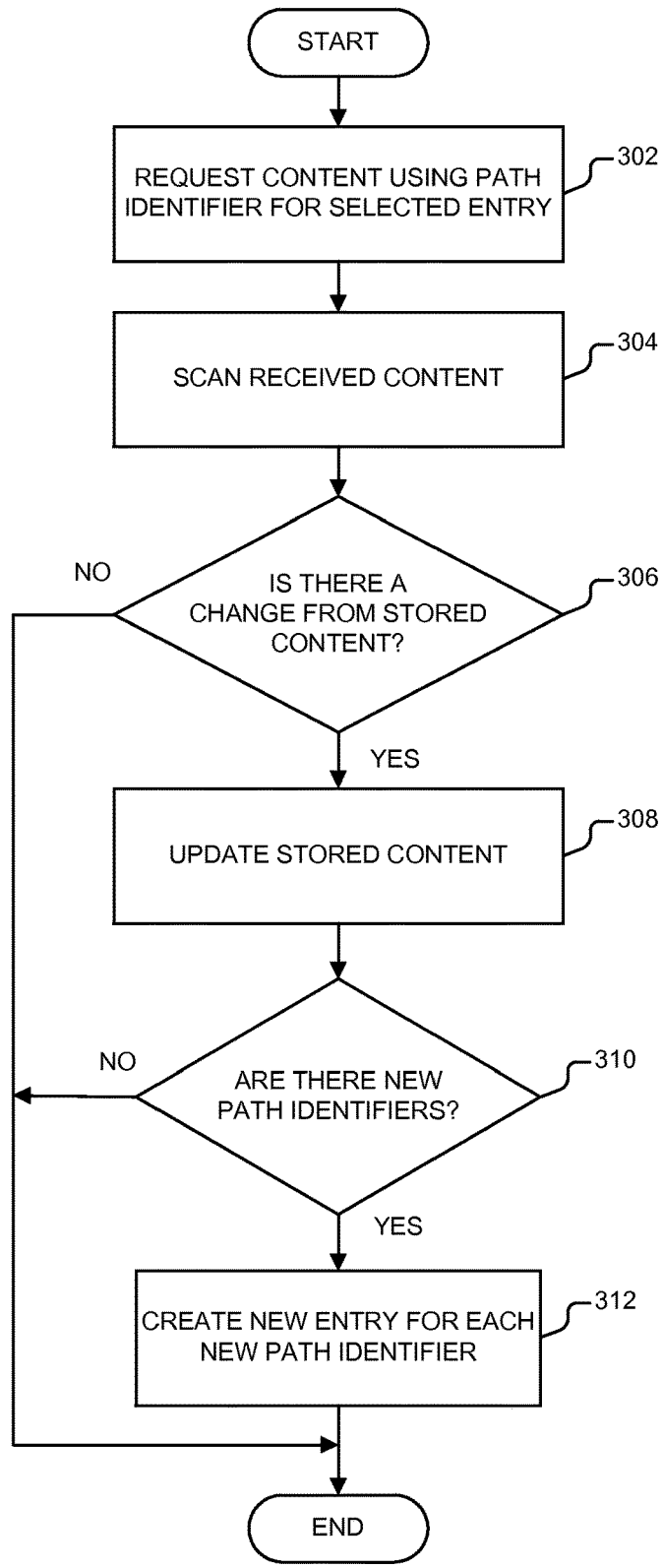
FIG. 3 is a flowchart for crawling path identifiers in some embodiments.

FIG. 3 is a flowchart for crawling path identifiers in some embodiments. In step 302, the crawler module 110 requests content using a path identifier from a selected entry. For example, the crawler module 110 may transmit a request to a web server 106-1 that maintains the data object associated with a path identifier. The data object may include or provide access to content that may be changed. For example, the data object may be a website maintained by a web server 106-1 and the path identifier may be a URL that identifies the location of the webpage. The crawler module 110 may use the URL to request the webpage from the appropriate web server 106-1.

In step 304, the crawler module 110 may scan the received content. At step 306, the crawler module 110 may determine whether the content includes any changes. For example, the crawler module 110 may compare the scanned content to a previously stored version of the content that is stored in the corpus data store 126. If the crawler module 110 determines that there is a change from the stored content, the method may continue to step 308 where the scraper module 112 may update the stored content. For example, the scraper module 112 may scrape some or all of the content from the data object and add or replace the stored content in the corpus data store 126 with the scraped content from the path identifier. For example, the scraper module 112 may copy all of the content from the data object and replace previously stored content with the copied content. Alternatively, the scraper module 112 may copy only the portions of the content that have changed and modify the stored content to reflect the changes.

At step 310, the crawler module 110 may determine whether there are any new path identifiers in the retrieved content. A new path identifier may be a path identifier embedded in the content (e.g., hyperlink in the data object) that is not included in the path identifier list. While scanning the retrieved content, the crawler module 110 may identify any embedded path identifiers and compare the path identifiers to the path identifier list to determine whether any of the embedded path identifiers are a new path identifier. If the crawler module 110 determines that there are new path identifiers in the retrieved content, the method may continue to step 312 where an entry creation module 120 creates a new entry for the new path identifier. For example, the entry creation module 120 may communicate with the data storage 122 to access the path identifier list and add a new entry in the path identifier list for the new path identifier.

In various embodiments, the content acquisition system 102 may assign a default time-stamp value to each new entry (e.g., the current time incremented by a predetermined default delta value). Similarly, the content acquisition system 102 may assign a default freshness value to each new entry. In some embodiments, the content acquisition system 102 may assign a time-stamp value to each new entry based on the time-stamp value and freshness value of related path identifiers and/or data objects. For example, if the crawler module 110 identifies one or more new path identifiers in a data object that was previously crawled, then the new path identifiers may inherit similar (e.g., the same) freshness values and/or updated time-stamp values as the "parent." It will be appreciated that the each new entry may be assigned time-stamp values and freshness values in any number of ways (e.g., inheriting a freshness value from a parent path identifier if any and receiving a current time as a time-stamp value).

Figure 4:
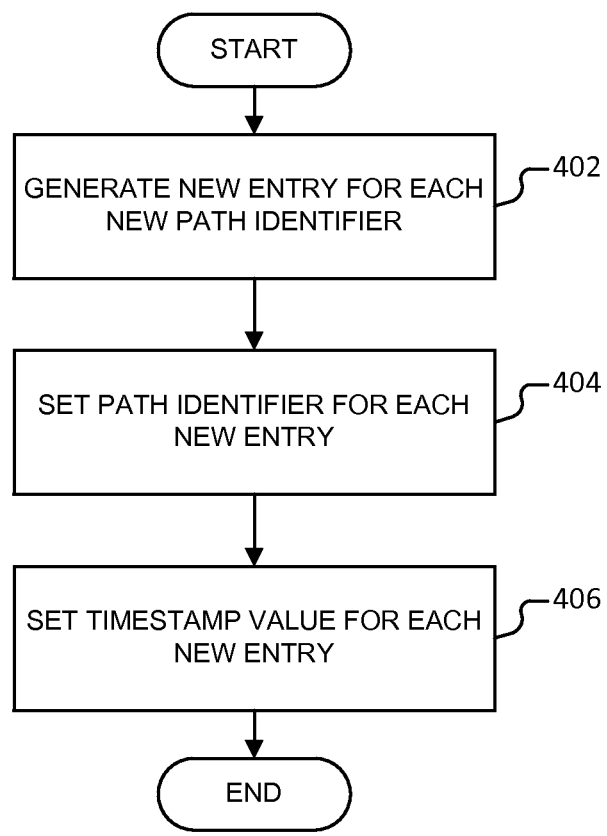
FIG. 4 is a flowchart for creating new entries in a path identifier list in some embodiments.

FIG. 4 is a flowchart for creating new entries in a path identifier list in some embodiments. In step 402, the entry creation module 120 generates a new entry in the path identifier list for one or more new path identifiers. For example, a crawler module 110 may identify path identifiers embedded within a data object that are not included in the path identifier list. The crawler module 110 may then provide the new path identifiers to the entry creation module 120. The entry creation module 120 may access the data storage 122 that maintains the path identifier list to modify the path identifier list and generate new entries in the path identifier list for new path identifiers received from the crawler module 110.

In step 404, the entry creation module 120 may set the path identifier for each new entry in the path identifier list. For example, the entry creation module 120 may set the path identifier for each new entry to be one or more of the new path identifiers identified by the crawler module 110.

In step 406, the entry creation module 120 may set a time-stamp value for each new entry. In some embodiments, the entry creation module 120 may generate the time-stamp value based on a current time value when the new entry was generated by the entry creation module 120. For example, the entry creation module 120 may set the time-stamp value for each new entry to be equal to or slightly later than the current time value when the new entry is created. This may result in the new path identifiers being crawled shortly after creation of the new entries. In some embodiments, the entry creation module 120 may be restricted from setting a time-stamp value to be earlier than a current time value.

In some embodiments, the entry creation module 120 may generate a time-stamp value for a new path identifier based on related path identifiers. For example, if the crawler module 110 crawls a first path identifier to a first data object that contains or is associated with a second path identifier, the entry creation module 120 may assign a time-stamp value to the second path identifier that is equal to or based on the updated time-stamp value of the first path identifier. Further, the entry creation module 120 may assign a freshness value to the second path identifier which is equal to or based on the freshness value of the first path identifier.

FIGS. 5A-5F depict entries in a path identifier list in some embodiments. As shown in FIG. 5A, the path identifier list may include three entries, 502, 504 and 506. Each entry 502, 504 and 506, may include a time-stamp value, one or more path identifiers, and a freshness value. As shown, the entries 502, 504 and 506 may be ordered in the path identifier list according to the time-stamp value assigned to each entry. For example, the first entry in the path identifier list is entry 502 which is assigned a time-stamp value of 10:00. Entry 502 is followed by entry 504, which is assigned a time-stamp value of 10:01, and entry 506, which is assigned a time-stamp value of 10:02.

An entry selection module 116 may select an entry from the path identifier list based on the time-stamp values assigned to the entries 502, 504 and 506. For example, the entry selection module 116 may select the entry with a time-stamp value that is no later than other time stamp values in the path identifier list. As shown in FIG. 5A, entry 502 is assigned a time-stamp value of 10:00, entry 504 is assigned a time-stamp value of 10:01 and entry 506 is assigned a time-stamp value of 10:02. The entry selection module 116 may select entry 502, which is assigned the earliest time-stamp value.

In some embodiments, the entry selection module 116 may determine whether the selected entry 502 is mature. For example, the entry selection module 116 may compare the time-stamp value to a current time value to determine whether the selected entry 502 is mature. If the current time value is equal to or later than the time-stamp value, the entry selection module 116 may determine that the selected entry is mature. If the current time value is earlier than the time-stamp value, the entry selection module 116 may determine that the selected entry is not mature. For example, if the current time value is 10:00 or later, the entry selection module may determine that entry 502 is mature. If the current time value is earlier than 10:00, for example if the current time value is 9:59, the entry selection module may determine that entry 502 is not mature.

Entries determined to be mature may be crawled by a crawler module 110 to access a data object which may be scraped by a scraper module 112. For example, upon a determination that entry 502 is mature, the entry selection module 116 may pass the path identifier for entry 502 (i.e., Path 1) to the crawler module 110. The crawler module 110 may then crawl Path 1, including accessing the data object identified by Path 1 to enable the scraper module 112 to index, scrape and/or copy content form the data object.

In some embodiments, if the entry selection module 116 determines that entry 502 is not mature, the entry selection module 116 may not pass the path identifier to the crawler module 110, but may rather wait a predetermined amount of time and then recheck whether entry 502 is mature. For example, if the current time value is 9:59 and the entry selection module 116 determines that entry 502 is not mature, the entry selection module 116 may wait a predetermined amount of time, such as one minute, and then recheck whether entry 502 is mature. After waiting the predetermined amount of time, the entry selection module 116 may recheck the time-stamp value at 10:00 and determine that entry 502 is mature. Requiring that an entry be mature prior to the path identifier being crawled and/or scraped may ensure that a path identifier is not crawled more frequently than intended.

After a path identifier has been crawled by the crawler module 110, the path identifier may be rescheduled to be crawled again at a later time. A freshness module 118 may calculate an updated time-stamp value for the entry of each crawled path identifier. In some embodiments, the freshness module 118 may calculate the updated time-stamp value for an entry based on a freshness value.

As shown, each entry 502, 504 and 506 is assigned a freshness value. For example, entry 502 is assigned a freshness value of 5, entry 504 is assigned a freshness value of 3 and entry 506 is assigned a freshness value of 7. The freshness value for each entry 502, 504 and 506, may indicate a priority for retrieving possibly changed content from the data object associated with the respective entry's path identifiers. For example, for entry 502, the freshness value of 5 may indicate a priority for retrieving possibly changed content from the data object associated with Path 1. Path 1 may be a URL that identifies the location of an application listing or website that has potentially changing content. The freshness value 5 may indicate a priority for retrieving the possibly changed content from the application listing or website. Likewise, for entry 504, the freshness value of 3 may indicate a priority for retrieving possibly changed content from the data object associated with Path 2, and for entry 506, the freshness value of 7 may indicate a priority for retrieving possibly changed content from the data object associated with Path 3.

In some embodiments, the freshness value may identify a specified time increment which may be used by the freshness module 118 to calculate an updated time-stamp value. Freshness values indicating a higher priority for retrieving possibly changed content may identify a shorter specified time increment than freshness values indicating a lower priority for retrieving possibly changed content. As a result, path identifiers with a freshness value indicating a high priority may be crawled more frequently than path identifiers with a freshness value indicating a low priority.

In some embodiments, the freshness value itself may be the specified time increment. For example, the freshness value of entry 502 may represent a specified time period of 5 minutes, the freshness value of entry 504 may represent a specified time period of 3 minutes and the freshness value of entry 506 may represent a specified time period of 7 minutes. The freshness module 118 may use the freshness values to calculate the updated time-stamp value for the entries 502, 504 and 506 as the path identifier of each entry is crawled. For example, the freshness module 118 may calculate the updated time-stamp value for an entry by adding the specified time period to a current time value at which the path identifier was crawled. Thus, when Path 1 is crawled, the freshness module 118 may calculate an updated time-stamp value for entry 502 by adding 5 minutes to the time at which Path 1 was crawled. Assuming that Path 1 was crawled at 10:00, the freshness module 118 may calculate the updated time-stamp value for entry 502 to be 10:05.

FIG. 5B shows the path identifier list shown in FIG. 5A reordered according to the updated time-stamp value for entry 502. As shown, the time-stamp value for entry 502 has been updated from 10:00 to the updated time-stamp value of 10:05 (using the freshness value). Further, the path identifier list has been reordered according to the time-stamp values. As a result, entry 502, which was at the top of the path identifier list shown in FIG. 5A, is now listed at the bottom of the path identifier list behind entries 504 and 506, which both have earlier time-stamp values than entry 502. It will be appreciated that the path identifier list may not be reordered in some embodiments. The entry selection module 116 may select entries based on time-stamp value regardless of physical order of the path identifier list.

The entry selection module 116 may select entry 504, which has the earliest time-stamp value in the path identifier list shown in FIG. 5B. If the entry selection module 116 determines that entry 504 is mature, the entry selection module 116 may provide Path 2 to the crawler module 110 to be crawled. Further, the freshness module 118 may calculate an updated time-stamp value for entry 504 based on the freshness value for entry 504. Assuming that Path 2 is crawled and/or scraped at 10:01, the freshness module 118 may calculate the updated time-stamp value for entry 504 by adding 3 minutes to 10:01, resulting in an updated time-stamp value of 10:04.

FIG. 5C shows the path identifier list shown in FIG. 5B reordered according to the updated time-stamp value for entry 504. As shown, the time-stamp value for entry 504 has been updated from 10:01 to 10:04. Further, the path identifier list has been reordered according to the time-stamp values of the entries 502, 504, and 506. As a result, entry 504, which was at the top of the path identifier list shown in FIG. 5B, is now listed after entry 506, however is still listed ahead of entry 502. The freshness value for entry 504 may indicate a higher priority than the freshness value of entry 502 and entry 504 may be crawled at a higher frequency than entry 502.

The entry selection module 116 may select entry 506, which has the earliest time-stamp value in the path identifier list shown in FIG. 5C. If the entry selection module 116 determines that entry 506 is mature, the entry selection module 116 may provide Path 3 to the crawler module 110 to be crawled. Further, the freshness module 118 may calculate an updated time-stamp value for entry 506 based on the freshness value for entry 506. Assuming that Path 3 is crawled and/or scraped at 10:02, the freshness module 118 may calculate the updated time-stamp value for entry 506 by adding 7 minutes to 10:02, resulting in an updated time-stamp value of 10:09.

FIG. 5D shows the path identifier list shown in FIG. 5C reordered according to the updated time-stamp value for entry 506. As shown, the time-stamp value for entry 506 has been updated from 10:02 to 10:09. Further, the path identifier list has been reordered according to the time-stamp values of the entries 502, 504, and 506. As shown, entry 506, which was at the top of the path identifier list shown in FIG. 5C, is listed last on the path identifier list behind entries 502 and 504.

The entry selection module 116 may select entry 504, which has the earliest time-stamp value in the path identifier list shown in FIG. 5D. If the entry selection module 116 determines that entry 504 is mature, the entry selection module 116 may provide Path 2 to the crawler module 110 to be crawled. Further, the freshness module 118 may calculate an updated time-stamp value for entry 504 based on the freshness value for entry 504. Assuming that Path 2 is crawled and/or scraped at 10:04, the freshness module 118 may calculate the updated time-stamp value for entry 504 by adding 3 minutes to 10:04, resulting in an updated time-stamp value of 10:07.

FIG. 5E shows the path identifier list shown in FIG. 5D reordered according to the updated time-stamp value for entry 504. As shown, the time-stamp value for entry 504 has been updated from 10:04 to 10:07. Further, the path identifier list has been reordered according to the time-stamp values of the entries 502, 504, and 506. As shown, entry 504, which was at the top of the path identifier list shown in FIG. 5D, is listed second on the path identifier list behind entries 502 and before entry 506.

The entry selection module 116 may select entry 502, which has the earliest time-stamp value in the path identifier list shown in FIG. 5E. If the entry selection module 116 determines that entry 502 is mature, the entry selection module 116 may provide Path 1 to the crawler module 110 to be crawled. Further, the freshness module 118 may calculate an updated time-stamp value for entry 502 based on the freshness value for entry 502. Assuming that Path 1 is crawled and/or scraped at 10:05, the freshness module 118 may calculate the updated time-stamp value for entry 502 by adding 5 minutes to 10:05, resulting in updated time-stamp value of 10:20.

FIG. 5F shows the path identifier list shown in FIG. 5E reordered according to the updated time-stamp value for entry 502. As shown, the time-stamp value for entry 502 has been updated from 10:05 to 10:10. Further, the path identifier list has been reordered according to the time-stamp values of the entries 502, 504, and 506. As shown, entry 502, which was at the top of the path identifier list as shown in FIG. 5E, is now listed last on the path identifier list behind entries 504 and entry 506.

The entry selection module 116 may select entry 504, which has the earliest time-stamp value in the path identifier list shown in FIG. 5F. If the entry selection module 116 determines that entry 504 is mature, the entry selection module 116 may provide Path 2 to the crawler module 110 to be crawled.

As illustrated in FIGS. 5A-5F, the entries 502, 504 and 506 may be selected according to the time-stamp value assigned to each entry. The time-stamp values may therefore provide an order in which the path identifiers are crawled and/or scraper by the crawler module 110 and scraper module 112. In addition to providing an order for the listed path identifiers, the time-stamp values may also ensure that the path identifiers are not crawled and/or scraped more frequently than desired. For example, requiring the entry selection module 116 to determine that an entry is mature prior to providing the corresponding path identifier to the crawler module 110 and/or scraper module 112 may ensure that the path identifier is not crawled and/or scraped prior to a desired time or more frequently than a desired rate based on the freshness value.

Further, as illustrated, the freshness value assigned to each entry 502, 504 and 506 may provide a priority to the path identifiers. For example, entry 504 is associated with the lowest freshness value of the three entries 502, 504 and 506, resulting in entry 504 being crawled and/or scraped at a higher frequency than entries 502 and 506. For example, within the discussion of FIGS. 5A-5F, entry 504 was listed first on the path identifier list three times, and thus Path 2 was crawled and/or scraped by the crawler module 110 three times during that span. In contrast, entry 506, which is associated with the highest freshness value of the three entries 502, 504 and 506, was only listed first on the path identifier list once and thus Path 1 was crawled only once by the crawler module 110 in the same span.

Figure 6:
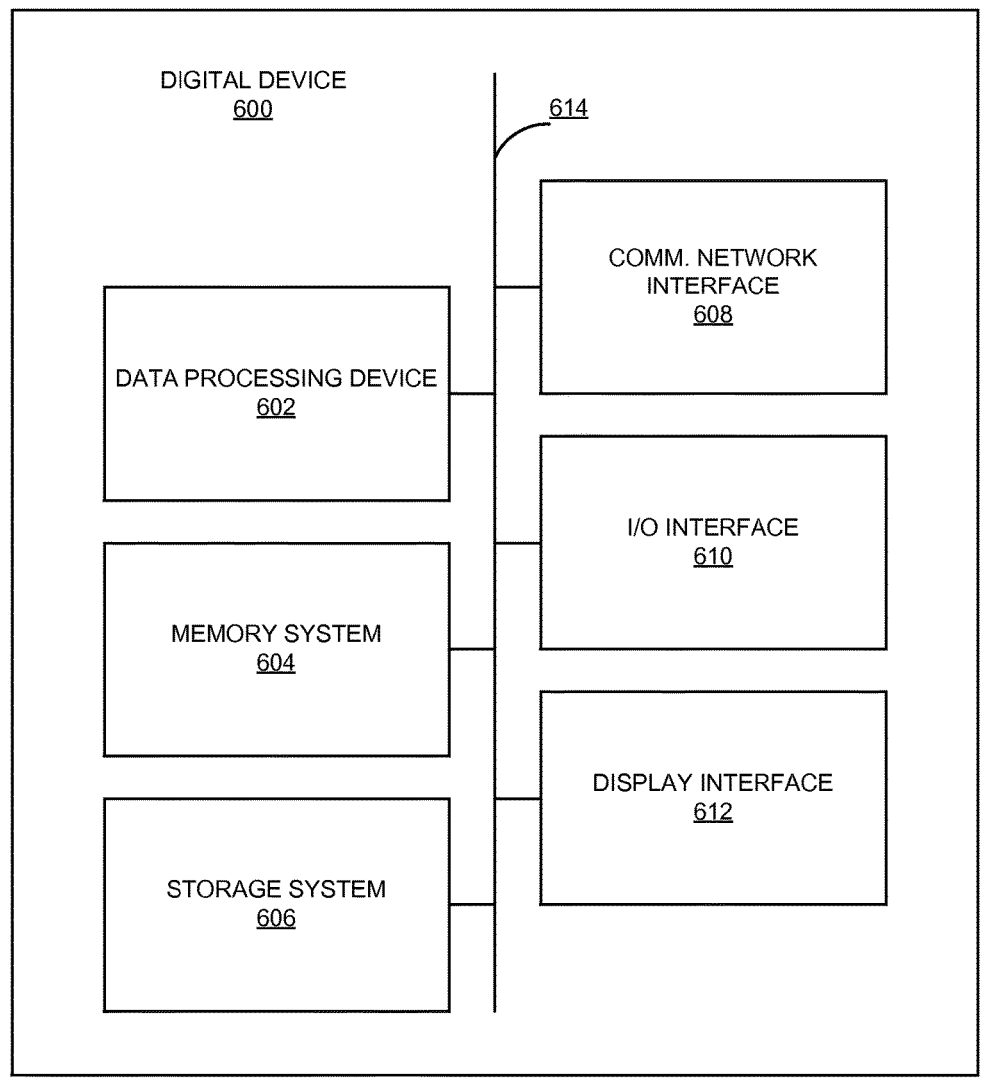
FIG. 6 is a block diagram of an example digital device.

FIG. 6 is a block diagram of an example digital device 600. The digital device 600 comprises a processor 602, a memory system 604, a storage system 606, a communication network interface 608, an I/O interface 610, and a display interface 612 communicatively coupled to a bus 614. The processor 602 is configured to execute executable instructions (e.g., programs). In some embodiments, the processor 602 comprises circuitry or any processor capable of processing the executable instructions.

The memory system 604 is any memory configured to store data. Some examples of the memory system 604 are storage devices, such as RAM or ROM. The memory system 604 may comprise the cache memory. In various embodiments, data is stored within the memory system 604. The data within the memory system 604 may be cleared or ultimately transferred to the storage system 606.

The storage system 606 is any storage configured to retrieve and store data. Some examples of the storage system 606 are flash drives, hard drives, optical drives, and/or magnetic tape. The storage system 606 may comprise non-transitory media. In some embodiments, the digital device 600 includes a memory system 604 in the form of RAM and a storage system 606 in the form of flash data. Both the memory system 1004 and the storage system 606 comprise computer readable media which may store instructions or programs that are executable by a computer processor including the processor 602.

The communication network interface (com. network interface) 608 may be coupled to a network (e.g., network 108) via the link 616. The communication network interface 608 may support communication over an Ethernet connection, a serial connection, a parallel connection, or an ATA connection, for example. The communication network interface 608 may also support wireless communication (e.g., 802.11 a/b/g/n, WiMax). It will be apparent to that the communication network interface 608 may support many wired and wireless standards.

The optional input/output (I/O) interface 610 is any device that receives input from the user and output data. The optional display interface 612 is any device that is configured to output graphics and data to a display. In one example, the display interface 612 is a graphics adapter. It will be appreciated that not all digital devices 600 comprise either the I/O interface 610 or the display interface 612.

The hardware elements of the digital device 600 are not limited to those depicted in FIG. 6. A digital device 600 may comprise more or less hardware elements than those depicted. Further, hardware elements may share functionality and still be within various embodiments described herein. In one example, encoding and/or decoding may be performed by the processor 602 and/or a co-processor, such as a processor located on a graphics processing unit (GPU).

The above-described functions and components may be comprised of instructions that are stored on a storage medium such as a computer readable medium (e.g., a non-transitory computer readable medium). The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention.

The present invention is described above with reference to example embodiments. Various modifications may be made and other embodiments may be used without departing from the broader scope of the present invention. Therefore, these and other variations upon the example embodiments are intended to be covered by the present invention.

The invention claimed is:

1. A method comprising:
 receiving a set of entries, each entry of the set of entries including a time-stamp value, a path identifier to a data object having content that may be changed, and a freshness value indicating a frequency to retrieve possibly changed content from the data object, wherein a time-stamp value of an entry is updated periodically based on a freshness value of the entry, wherein a plurality of entries in the set of entries are ordered based on time-stamp values of the entries;
 selecting a first entry to be retrieved from the plurality of entries, in order of the plurality of entries, wherein the selected first entry includes a first time-stamp value identifying a first time being no later than other times identified by time-stamp values of other entries of the set of entries;
 retrieving first content from a first data object using a first path identifier of the selected first entry; and
 after the retrieving the first content, updating a first time-stamp value of the selected first entry based on a freshness value of the selected first entry so as to re-order the plurality of entries in the set of entries,
 wherein a first entry and a second entry in the set of the entries include different freshness values, and
 wherein first content of the first entry is retrieved at a higher frequency than second content of the second entry, based on a difference of the freshness values.

2. The method of claim 1, further comprising:
 determining that the selected first entry is a mature entry based on whether the first time-stamp value is later than a time when the first entry was selected;
 retrieving first content from a first data object using a first path identifier of the selected first entry, upon a determination that the selected first entry is the mature entry;
 waiting a predetermined amount of time, upon a determination that the selected first entry is a non-mature entry; and
 after the predetermined amount of time has passed, re-selecting a first entry to be retrieved.

3. The method of claim 1, wherein the first time-stamp value of the first entry is updated by adding a first freshness value of the first entry to a time when the first content was retrieved.

4. The method of claim 1, further comprising:
 storing the first content retrieved from the first data object.

5. The method of claim 1, further comprising:
 analyzing the first content for a new path identifier not included in any entry in the set of entries.

6. The method of claim 5, further comprising:
 upon a determination that the first content includes a new path identifier, adding a new entry to the set of entries, the new entry including the new path identifier and a second time-stamp value.

7. The method of claim 6, wherein the second time-stamp value is set based on a time when the new entry is created.

8. The method of claim 1, further comprising:
 receiving a first freshness value of the first entry;
 storing the first freshness value in memory; and
 prior to updating the first time-stamp value of the first entry, retrieving the first freshness value from memory.

9. A system comprising:
 one or more processors; and
 a memory that stores instructions for causing, when executed, the one or more processors to:
  receive a set of entries, each entry of the set of entries including a time-stamp value, a path identifier to a data object having content that may be changed, and a freshness value indicating a frequency to retrieve possibly changed content from the data object, wherein a time-stamp value of an entry is updated periodically based on a freshness value of the entry, wherein a plurality of entries in the set of entries are ordered based on time-stamp values of the entries,
  select a first entry to be retrieved from the plurality of entries, in order of the plurality of entries, wherein the selected first entry includes a first time-stamp value identifying a first time being no later than other times identified by time-stamp values of other entries of the set of entries,
  retrieve first content from a first data object using a first path identifier of the selected first entry, and
  after the retrieving the first content, update a first time-stamp value of the selected first entry based on a freshness value of the selected first entry so as to re-order the plurality of entries in the set of entries,
 wherein a first entry and a second entry in the set of the entries include different freshness values, and
 wherein first content of the first entry is retrieved at a higher frequency than second content of the second entry, based on a difference of the freshness values.

10. The system of claim 9, wherein the instructions for causing, when executed, the one or more processors to:
 determine that the selected first entry is a mature entry based on whether the first time-stamp value is later than a time when the first entry was selected;
 retrieve first content from a first data object using a first path identifier of the selected first entry, upon a determination that the selected first entry is the mature entry;
 wait a predetermined amount of time, upon a determination that the selected first entry is a non-mature entry; and
 after the predetermined amount of time has passed, re-select a first entry to be retrieved.

11. The system of claim 9, wherein the first time-stamp value of the first entry is updated by adding a first freshness value of the first entry to a time when the first content was retrieved.

12. The system of claim 9, wherein the instructions for causing, when executed, the one or more processors to store the first content retrieved from the first data object.

13. The system of claim 9, wherein the instructions for causing, when executed, the one or more processors to analyze the first content for a new path identifier not included in any entry in the set of entries.

14. The system of claim 13, wherein the instructions for causing, when executed, the one or more processors to add a new entry to the set of entries upon a determination that the first content includes a new path identifier, the new entry including the new path identifier and a second time-stamp value.

15. The system of claim 14, wherein the second time-stamp value is set based on a time when the new entry is created.

16. The system of claim 9, wherein the instructions for causing, when executed, the one or more processors to:
receive a first freshness value of the first entry;
store the first freshness value in memory; and
prior to updating the first time-stamp value of the first entry, retrieve the first freshness value from memory.

17. A non-transitory computer readable medium comprising executable instructions, the instructions being executable by a data processing device to perform a method, the method comprising:

receiving a set of entries, each entry of the set of entries including a time-stamp value, a path identifier to a data object having content that may be changed, and a freshness value indicating a frequency to retrieve possibly changed content from the data object, wherein a time-stamp value of an entry is updated periodically based on a freshness value of the entry, wherein a plurality of entries in the set of entries are ordered based on time-stamp values of the entries;

selecting a first entry to be retrieved from the plurality of entries, in order of the plurality of entries, wherein the selected first entry includes a first time-stamp value identifying a first time being no later than other times identified by time-stamp values of other entries of the set of entries;

retrieving first content from a first data object using a first path identifier of the selected first entry; and after the retrieving the first content, updating a first time-stamp value of the selected first entry based on a freshness value of the selected first entry so as to re-order the plurality of entries in the set of entries, wherein a first entry and a second entry in the set of the entries include different freshness values, and wherein first content of the first entry is retrieved at a higher frequency than second content of the second entry, based on a difference of the freshness values.

\* \* \* \* \*